(12) United States Patent
Patel

(10) Patent No.: US 9,756,295 B2
(45) Date of Patent: Sep. 5, 2017

(54) SIMULTANEOUS RECORDING OF A LIVE EVENT AND THIRD PARTY INFORMATION

(75) Inventor: Paritosh Patel, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 1876 days.

(21) Appl. No.: 11/967,155

(22) Filed: Dec. 29, 2007

(65) Prior Publication Data

US 2009/0167860 A1 Jul. 2, 2009

(51) Int. Cl.
| | |
|---|---|
| G06F 15/16 | (2006.01) |
| H04N 7/18 | (2006.01) |
| H04N 5/77 | (2006.01) |
| H04N 5/765 | (2006.01) |
| H04N 9/82 | (2006.01) |

(52) U.S. Cl.
CPC ............ *H04N 7/183* (2013.01); *H04N 5/772* (2013.01); *H04N 5/765* (2013.01); *H04N 9/8205* (2013.01)

(58) Field of Classification Search
CPC ........ H04N 7/183; H04N 5/772; H04N 5/765; H04N 9/8205
USPC ........................................................ 348/157
See application file for complete search history.

(56) References Cited

U.S. PATENT DOCUMENTS

| | | | |
|---|---|---|---|
| 6,630,963 B1 * | 10/2003 | Billmaier ...................... 348/485 |
| 6,750,919 B1 * | 6/2004 | Rosser .......................... 348/584 |
| 6,970,189 B1 * | 11/2005 | Bernstein et al. ......... 348/211.2 |
| 6,980,113 B1 | 12/2005 | Uehran | |
| 8,184,161 B2 * | 5/2012 | Trapani ................. B60R 25/102 348/143 |
| 8,613,037 B2 * | 12/2013 | Casey ................ H04N 7/17318 725/100 |
| 8,752,111 B2 * | 6/2014 | Roberts ............... H04L 12/4625 725/114 |
| 8,918,708 B2 * | 12/2014 | Merril ................ G02B 26/0816 715/201 |
| 9,002,979 B2 * | 4/2015 | Hansen .............. A63B 24/0021 340/10.1 |
| 9,100,723 B2 * | 8/2015 | Nguyen ............ G06F 17/30796 |
| 9,124,650 B2 * | 9/2015 | Maharajh ................ G06F 21/10 |
| 9,148,585 B2 * | 9/2015 | Cragun ................... H04N 5/247 |
| 9,154,247 B2 * | 10/2015 | Altman ................... H04H 60/04 |
| 9,160,976 B2 * | 10/2015 | McCarthy ............ H04N 7/1675 |
| 9,185,333 B2 * | 11/2015 | Limbasia ............... H04N 5/765 |
| 9,384,587 B2 * | 7/2016 | Davison ................... G06T 17/00 |
| 9,396,475 B2 * | 7/2016 | Cristofalo .............. G06Q 30/02 |
| 9,451,202 B2 * | 9/2016 | Beals ..................... H04N 5/782 |
| 9,479,550 B2 * | 10/2016 | Hayes ................. H04L 12/1859 |
| 9,479,737 B2 * | 10/2016 | Akella ................... H04N 7/163 |
| 9,510,044 B1 * | 11/2016 | Pereira ............ H04N 21/44008 |

(Continued)

*Primary Examiner* — Melvin H Pollack

(74) *Attorney, Agent, or Firm* — Steven M. Greenberg, Esq.; CRGO Law

(57) ABSTRACT

Embodiments of the present invention address deficiencies of the art in respect to live event recording and provide a novel and non-obvious method, system and computer program product for recording a live event. In this regard, in one embodiment of the invention, a live event recording method can be provided. The live event recording method can include wirelessly acquiring third party information regarding a live performance from a third party information source over a computer communications network, and simultaneously recording both the live performance and also the third party information onto a single recordable medium.

7 Claims, 2 Drawing Sheets

(56) References Cited

U.S. PATENT DOCUMENTS

| | | | |
|---|---|---|---|
| 9,609,278 B2* | 3/2017 | Koplar | H04N 7/163 |
| 2005/0187644 A1* | 8/2005 | Neale et al. | 700/91 |
| 2007/0081678 A1* | 4/2007 | Minnich | 381/123 |
| 2008/0089666 A1* | 4/2008 | Aman | 386/95 |
| 2008/0209482 A1* | 8/2008 | Meek et al. | 725/105 |
| 2009/0189982 A1* | 7/2009 | Tawiah | 348/157 |
| 2009/0245046 A1* | 10/2009 | Utsumi et al. | 369/47.15 |
| 2012/0166951 A1* | 6/2012 | Steelberg | H04N 5/765 715/719 |
| 2014/0243094 A1* | 8/2014 | Tayloe | A63F 13/795 463/42 |
| 2015/0124109 A1* | 5/2015 | Kryeziu | H04N 5/23206 348/211.3 |
| 2015/0237383 A1* | 8/2015 | Riedl | H04N 21/2385 725/35 |
| 2015/0244969 A1* | 8/2015 | Fisher | H04N 9/8205 386/224 |
| 2015/0297949 A1* | 10/2015 | Aman | G06F 17/30781 348/157 |
| 2016/0008695 A1* | 1/2016 | Aman | H04N 7/181 348/157 |
| 2016/0142782 A1* | 5/2016 | Pizzurro | H04N 21/64322 725/5 |
| 2016/0214008 A1* | 7/2016 | Heck | A63F 13/828 |
| 2016/0337710 A1* | 11/2016 | Badaan | H04L 12/1859 |

* cited by examiner

SIMULTANEOUS RECORDING OF A LIVE EVENT AND THIRD PARTY INFORMATION

BACKGROUND OF THE INVENTION

Field of the Invention

The present invention relates to the field of live performance recording and more particularly to the generation and display of live performance information concurrent with the recording of a live performance.

Description of the Related Art

Spectator events and, in particular, spectator sporting events have become a multibillion dollar a year business throughout the world. Rather than merely watching sporting events on television, fans are willing to pay for the privilege of attending such events live in order to enjoy the spontaneity and excitement. During the course of a live performance, a limited amount of information can be shared with spectators using large screen displays including scoreboards. A live performance further can be supplemented with paper pamphlets which supply the relevant information about the event. Ordinarily, when an event ends, these pamphlets will be discarded.

Very often, fans record live public or private events with a digital camera or camcorder for later viewing. Still, the enhanced experience a fan gets from being at a live event cannot usually be reproduced even if the fan records the game on a camcorder. Such a recording would not only lack basic information about the event, such as the name, date, referees and roster list presented in the event's pamphlet, but also the recording would lack detailed information such as penalty shots, detailed information about the weather, or timestamps on winning runs and other statistical information that might be relevant to an event. Thus, the enhanced experience a fan gets from witnessing a live performance cannot usually be reproduced even if the fan records the performance on a camcorder.

Unless a fan attends a live performance, there is no such medium that allows a fan at home to re-live the moment to its full effect. Even though some information about a live event can be relayed to the scoreboard, even wirelessly nowadays, these wireless systems can only transmit to the scoreboard so that spectators can see relevant information. Scorekeepers are usually equipped with logging detailed information about the live event on their laptops, which can be relayed to website, but none of this detailed information is currently available for access if an individual fan is interested in recording and gathering all relevant information pertaining to a live event.

BRIEF SUMMARY OF THE INVENTION

Embodiments of the present invention address deficiencies of the art in respect to live event recording and provide a novel and non-obvious method, system and computer program product for recording a live event. In this regard, in one embodiment of the invention, a live event recording method can be provided. The live event recording method can include wirelessly acquiring third party information regarding a live performance from a third party information source over a computer communications network, and simultaneously recording both the live performance and also the third party information onto a single recordable medium.

In yet another embodiment of the invention, a live event recording data processing system can be provided. The system can include a single recordable medium, a video recorder coupled to the single recordable medium, and synchronizing recorder logic coupled to the video recorder comprising program code enabled to simultaneously record onto the single recordable medium both a live performance through the video recorder, and also third party information related to the live performance and retrieved wirelessly from over a computer communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for recording a live event. In accordance with an embodiment of the present invention, a recording device can record a live performance onto a single recordable medium. The recording device further can wirelessly acquire third party information regarding the live performance from a third party information source over a computer communications network. Notably, the third party information can be simultaneously recorded along with the live performance onto the single recordable medium. In this way, a fan can reproduce the enhanced experience of witnessing the live performance.

Figure 1:
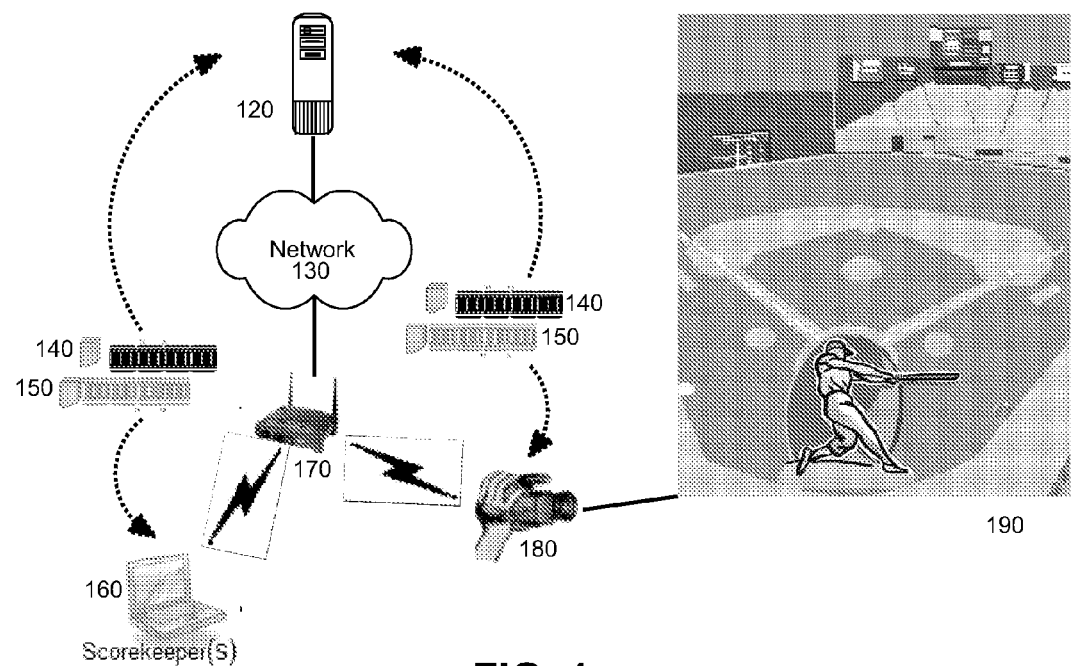
FIG. 1 is a pictorial illustration of a recording device configured for simultaneously recording both a live performance and third party information onto a single recordable medium.

In further illustration, FIG. 1 is a pictorial illustration of a recording device configured for simultaneously recording both a live performance and third party information onto a single recordable medium. As shown, a server 120 can compile third party information that can be transmitted over a computer communications network 130 supporting a wireless router 170. Third party information can include but is not limited to, basic event overview information 140, such as the name of the event, the teams playing, the location, and the roster of each team. Additionally, a local scorekeeper 160 can broadcast updated third party information associated with the latest event information 150, such as minute-byminute score information, players who scored, players who received a penalty, and other detailed information regarding the live event.

When a spectator using a recording device 180 starts recording a live event 190, the recording device can scan available networks and connect to broadcast data identifying the specific server to establish communication with in order to receive third party information simultaneously while recording the live event. Alternatively the recording device 180 can use a default address for all such networks. It can be noted that a person skilled in the art would recognize that different protocols such as TCPIP or Bluetooth can be implemented.

As the recording device 180 is recording the live event 190 it polls the server that can transmit third party information 140, 150 to the recording device 180 so that while recording the live event 190, third party information 140, 150 can simultaneously be recorded onto a single recordable medium in the recording device.

Figure 2:
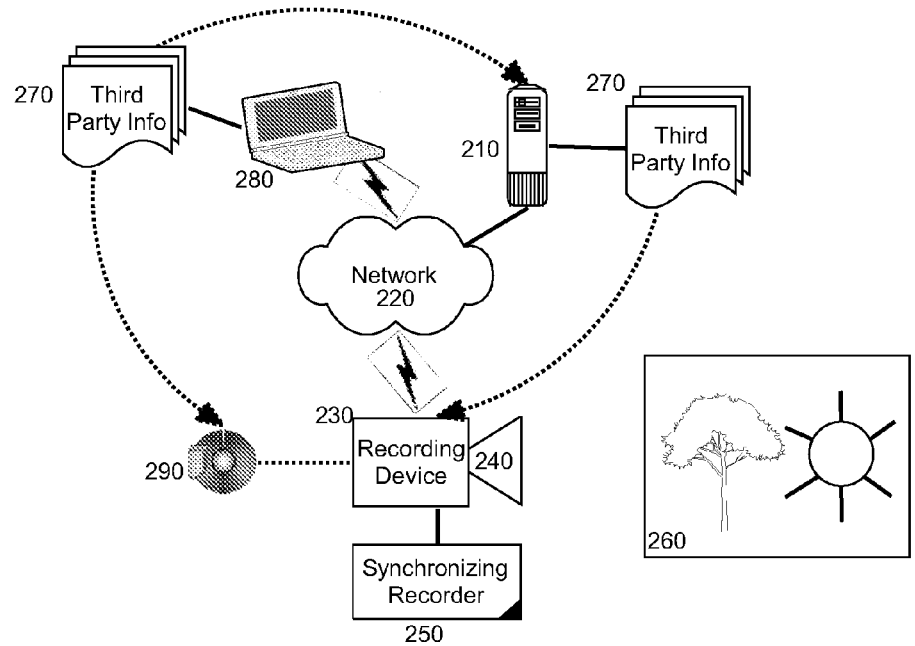
FIG. 2 is a schematic illustration of a live event recording data processing system configured for simultaneously recording both a live performance and third party information onto a single recordable medium; and, FIG. 3 is a flow chart illustrating a process for simultaneously recording both a live performance and third party information onto a single recordable medium.

In further illustration, FIG. 2 is a schematic illustration of a live event recording data processing system configured for simultaneously recording both a live performance and third party information onto a single recordable medium. The system can include a host server 210 configured for communicative coupling to one or more local clients 280 and one or more spectators using a recording device 230 with a lens 240 over computer communications network 220. The host server 210 can support the compilation of third party information 270 serving each of the clients 280 and spectators using a recording device 230. The client 280 such as a local scorekeeper can also create third party information 270 to be transmitted wirelessly to the server 210. Third party information 270 including basic event information and latest event information, and even non-event information, such as the weather at the time of the event, can be transmitted to the recording device 230. The recording device 230 can be coupled to synchronizing recorder logic 250 having program code enabled to simultaneously record both a live event 260 and also the third party information 270 onto a single recordable medium 290.

Figure 3:
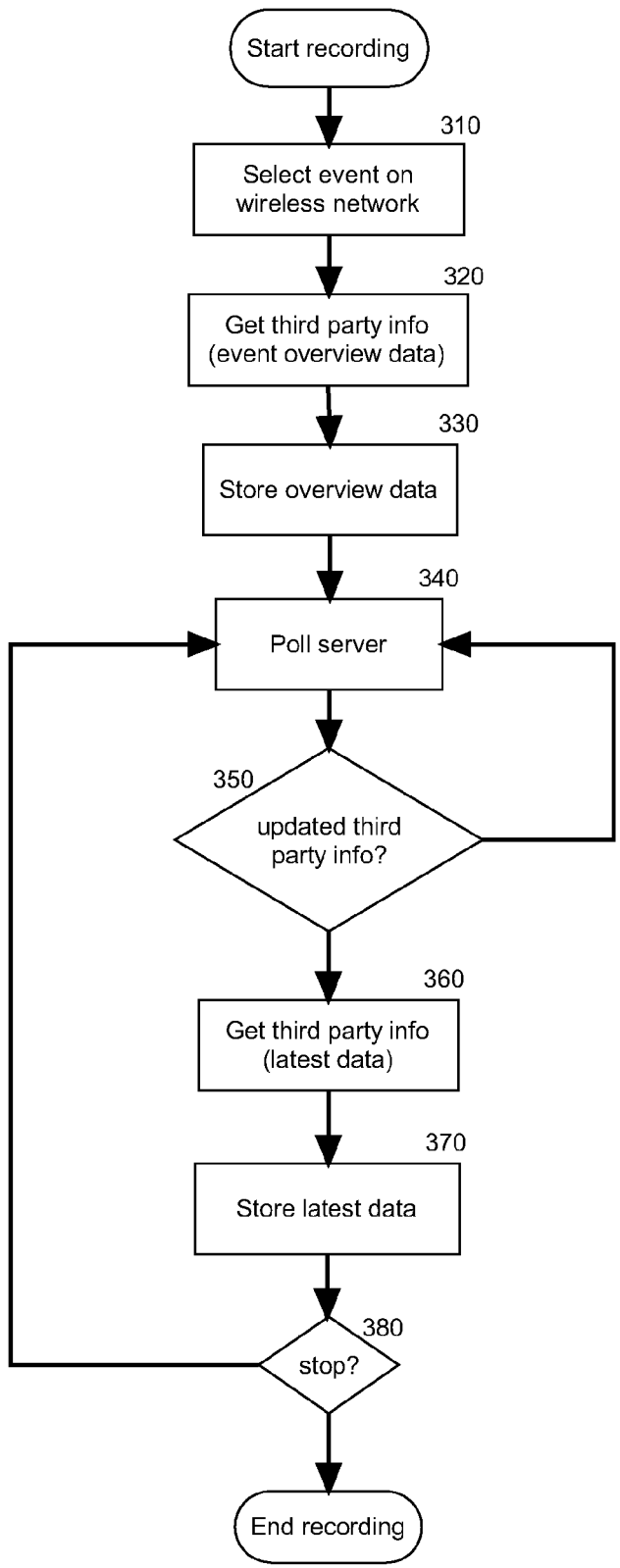

In yet further illustration of the operation of the synchronizing recorder logic 250, FIG. 3 is a flow chart illustrating a process for simultaneously recording both a live performance and third party information onto a single recordable medium. When a recording device starts recording, in block 310 an event of interest can be selected from a scan of available networks in the local area. Thus, if there are multiple baseball games going on at the same time, the recording device can select the one that the spectator wants to record.

Next in block 320, the can receive wirelessly third party information that is basic overview data generated regarding the live event/performance from a third party source such as an internet feed or a local scorekeeper. The basic overview data can be simple data regarding the live event's attributes, such as the location of the event, the teams present, and the roster of each team. Next in block 330 the overview data can be stored in the recording device and simultaneously in block 340 the recording device can periodically poll the server, and in decision block 350 it can be determined whether or not there is any updated information from the third party source. If not, then the recording device can continue to poll the server 340.

Otherwise, if there is an update, then in block 360 the recording device can retrieve the latest data from the third party source entailing detailed information minute-by-minute or updates on players and penalty shots. Next in block 370 the latest data can be stored in the recording device and this cycle of simultaneously recording both the live event and also third party information onto a single recordable medium for each recorded segment can continue until in decision block 280 the recording device is stopped from recording.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

I claim:

1. A live event recording method comprising:
    initiating recording of a live sporting event at a stadium by a handheld video recorder positioned in the stadium;
    responsive to the recording by the handheld video recorder of the live sporting event, scanning available broadcast networks for an Internet feed broadcasting digital information specific to the live sporting event and selecting a specific Internet feed broadcasting digital information specific to the live sporting event;
    wirelessly acquiring from the selected specific Internet feed through a wireless computer communications network interface in the handheld video recorder, third party information regarding the live sporting event from selected network; and,
    simultaneously recording both the live sporting event in the handheld video recorder, and also the third party information received from the selected specific Internet feed onto a single recordable medium in the handheld video recorder;

the handheld video recorder periodically polling the selected specific Internet feed to determine whether or not the selected specific Internet feed has provided updated information from the third party information source and, on condition that it is determined that the selected specific Internet feed has provided updated information from the third party information source, retrieving the updated information from the selected specific Internet feed and simultaneously recording both the live sporting event and also the updated information onto the single recordable medium of the handheld video recorder.

2. The method of claim 1 wherein third party information comprises event overview information selected from the group consisting of a name of the live performance, a name of a team participating in the live performance, a location of the live performance, and the roster of a team participating in the live performance.

3. The method of claim 1 wherein third party information comprises updated third party information selected from the group consisting of minute-by-minute score information for the live performance, scoring players in the live performance, and penalized players in the live performance.

4. A live event recording data processing system comprising:

a single recordable medium disposed in a handheld video recorder comprising a network interface configured to communicate over a computer communications network; and synchronizing recorder logic executing in the handheld video recorder, the synchronizing recorder logic comprising program code enabled to initiate recording of a live sporting event at a stadium by the handheld video recorder positioned in the stadium, respond to the recording by the handheld video recorder of the live sporting event by scanning available broadcast networks for an Internet feed broadcasting digital information specific to the live sporting event and selecting a specific Internet feed broadcasting digital information specific to the live sporting event, wirelessly acquire from the selected specific Internet feed through the network interface in the handheld video recorder, third party information regarding the live performance from selected network, and to simultaneously record onto the single recordable medium using the handheld video recorder both the live sporting event and also the third party information related to the live sporting event and received from the selected specific Internet feed the handheld video recorder periodically polling the selected specific Internet feed to determine whether or not the selected specific Internet feed has provided updated information from the third party information source retrieving the updated information and simultaneously recording both the live sporting event and also the updated information onto the single recordable medium of the handheld video recorder.

5. A computer program product comprising a computer storage memory device storing computer usable program code for live event recording, the computer program product comprising:

computer usable program code for initiating recording of a live sporting event at a stadium by a handheld video recorder positioned in the stadium;

computer usable program code for responding to the recording by the handheld video recorder of the live sporting event by scanning available broadcast networks for an Internet feed broadcasting digital information specific to the live sporting event and selecting a specific Internet feed broadcasting digital information specific to the live sporting event;

computer usable program code for wirelessly acquiring from the selected specific Internet feed through a wireless computer communications network interface in the handheld video recorder, third party information regarding the live sporting event from selected network; and, computer usable program code for simultaneously recording both the live sporting event in the handheld video recorder, and also the third party information received from the selected specific Internet feed onto a single recordable medium in the handheld video recorder;

the handheld video recorder periodically polling the selected specific Internet feed to determine whether or not the selected specific Internet feed has provided updated information from the third party information source and, on condition that it is determined that the selected specific Internet feed has provided updated information from the third party information source, retrieving the updated information from the selected specific Internet feed and simultaneously recording both the live sporting event and also the updated information onto the single recordable medium of the handheld video recorder.

6. The computer program product of claim 5, wherein third party information comprises event overview information selected from the group consisting of a name of the live performance, a name of a team participating in the live performance, a location of the live performance, and the roster of a team participating in the live performance.

7. The computer program product of claim 5, wherein third party information comprises updated third party information selected from the group consisting of minute-by-minute score information for the live performance, scoring players in the live performance, and penalized players in the live performance.

* * * * *